United States Patent [19]

Stich

[11] 4,128,793
[45] Dec. 5, 1978

[54] POWER CIRCUIT FOR VARIABLE FREQUENCY, VARIABLE MAGNITUDE POWER CONDITIONING SYSTEM

[75] Inventor: Frederick A. Stich, Milwaukee, Wis.

[73] Assignee: Allis-Chalmers Corporation, Milwaukee, Wis.

[21] Appl. No.: 818,986

[22] Filed: Jul. 25, 1977

[51] Int. Cl.² ............................................. H02P 5/40
[52] U.S. Cl. .................................. 318/808; 318/341; 363/96; 363/124; 363/135; 318/722
[58] Field of Search ............... 318/227, 230, 231, 341; 363/80, 96, 97, 124, 135

[56] References Cited

U.S. PATENT DOCUMENTS

| | | | |
|---|---|---|---|
| 3,237,081 | 2/1966 | Martin | 363/97 |
| 3,584,279 | 6/1971 | Krauthamer et al. | 318/227 |
| 3,826,966 | 7/1974 | Nagasaka et al. | 318/341 X |
| 3,848,176 | 11/1974 | Etter | 363/96 |
| 4,024,444 | 5/1977 | Dewan et al. | 318/227 |
| 4,048,554 | 9/1977 | Stich | 363/124 |
| 4,050,006 | 9/1977 | Stich | 363/124 |
| 4,051,417 | 9/1977 | Fujinawa et al. | 318/341 X |

*Primary Examiner*—Gene Z. Rubinson
*Attorney, Agent, or Firm*—Lee H. Kaiser

[57] ABSTRACT

A power circuit arrangement for a power conditioning system adapted to supply variable frequency, variable magnitude voltage to an electromagnetic device such as an electric motor having a center-tapped winding includes first and second inverting thyristors connected to the respective winding ends and connected in series with a transistor chopper across a unidirectional source so that the inverting thyristors may be gated on alternately at a relatively low modulation frequency while the chopper is time ratio controlled at a higher carrier frequency to selectively vary the voltage applied to the winding; a capacitor in shunt to the chopper which is overcharged due to winding leakage reactance when the chopper is turned off to reverse bias and "soft" commutate the thyristors when they are not conducting load current; a free-wheeling thyristor connected between the winding center tap and the chopper and poled to form a low-impedance free-wheeling path for winding current in series with the inverting thyristors when the chopper is turned off; and first and second energy recovery diodes connected across the serial arrangement of the chopper with the respective inverting thyristors to provide paths for out-of-phase currents and for current when the free-wheeling thyristor is turned off during commutation of the inverting thyristors.

16 Claims, 3 Drawing Figures

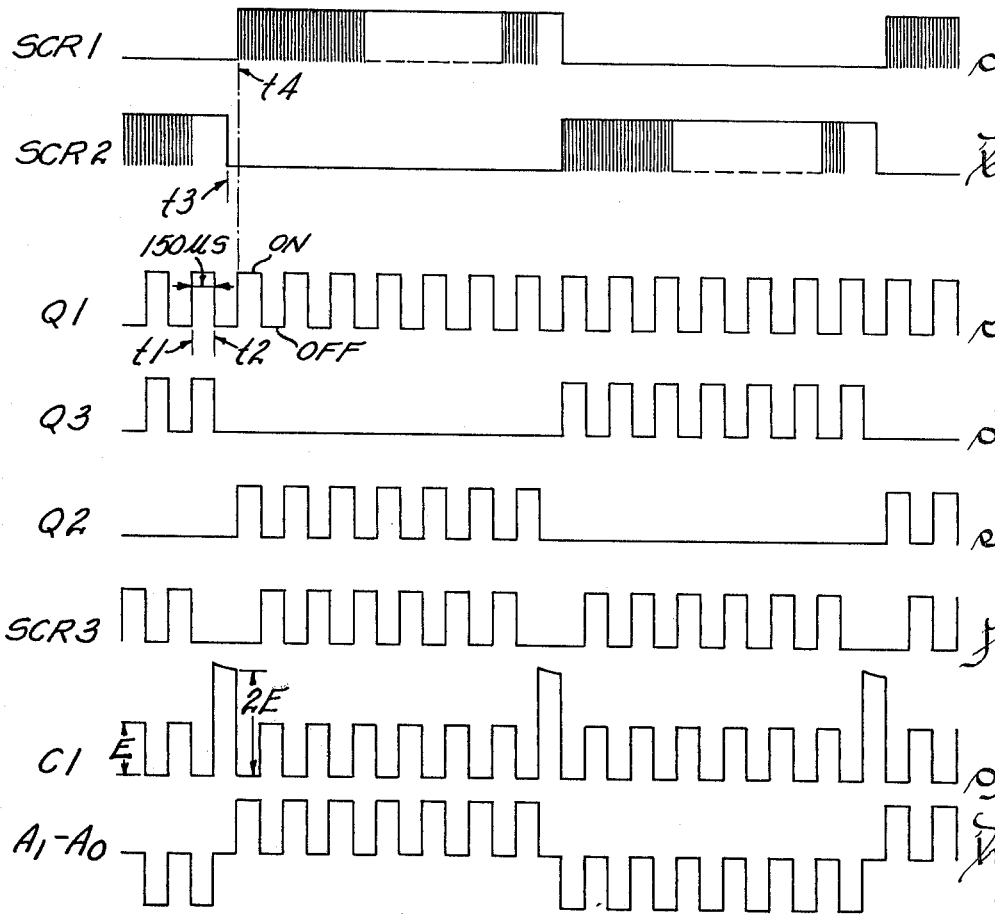

POWER CIRCUIT FOR VARIABLE FREQUENCY, VARIABLE MAGNITUDE POWER CONDITIONING SYSTEM

BACKGROUND OF THE INVENTION

This invention relates to electricity conversion systems, often termed power conditioning systems, for supplying variable frequency, variable magnitude voltage to an electromagnetic device such as an electric motor and in particular to a power circuit arrangement for such a system.

Several different types of variable frequency, variable voltage power conditioning systems are known, but they all have singular inherent disadvantages. For example, some known variable frequency, variable voltage power conditioning systems utilize forced-commutation thyristors while others employ various bridge circuit arrangements or transistors in push-pull arrangements. Such known power conditioning systems which employ forced-commutation require high speed thyristors that are relatively expensive, are bulky, and have high losses. For example, pulse width modulated inverters of the thyristor type necessitate reactive energy storage and expensive commutation circuits and must employ high-speed, and thus expensive, thyristors since they switch at carrier frequency, while thyristor inverters having a voltage-controlling transistor chopper commutate the thyristors off when they are conducting load current and thus require large and expensive inductive and capacitive elements in the commutation circuits. Variable frequency, variable voltage supplies which utilize power transistors in push-pull arrangements are relatively expensive, do not provide free-wheeling paths for load current, and require special and expensive biasing circuits for the power transistors. Known bridge arrangements which provide variable frequency, variable voltage power are relatively inefficient at low voltage and expensive to construct and operate.

OBJECTS OF THE INVENTION

It is an object of the invention to provide an improved low-cost, compact, efficient and relatively simple power circuit arrangement for an electric power conditioning system.

It is a further object of the invention to provide an improved variable frequency, variable voltage supply for power conditioning applications which employs thyristors to switch current but does not require forced-commutation circuits to switch the thyristors.

Another object is to provide such a power circuit arrangement for variable frequency, variable voltage power conditioning applications having thyristors for supplying wave forms made up of variable width carrier frequency pulses to a load and wherein the thyristors switch at relatively low modulation frequency and may be of the low-speed, inexpensive type.

Still another object is to provide an improved power circuit for a variable frequency, variable magnitude power conditioning system of the thyristor type having a voltage-controlling chopper and wherein the thyristors are "soft" commutated while the chopper is turned off and load current is not flowing through the thyristors, thereby eliminating large and expensive inductive and capacitive commutation elements.

It is a still further object of the invention to provide such a power circuit for a variable frequency, variable voltage traction motor drive employing a semiconductor chopper and which provides free-wheeling paths for motor winding currents when the chopper is turned off.

Still another object is to provide such an improved power circuit for a variable frequency, variable voltage power supply having a voltage-controlling transistor chopper which is used during both the positive and the negative half cycles of output frequency.

Another object is to provide such an improved power circuit for a variable frequency, variable voltage power supply wherein the voltage drop in the load circuit is substantially less than in prior art apparatus and is limited to the forward voltage drop across a thyristor plus the voltage drop across one saturated transistor.

A still further object is to provide such an inexpensive, compact, power circuit for an electricity conversion system utilizing thyristors and a high frequency transistor chopper and which has a novel and low-cost power transistor biasing arrangement.

DESCRIPTION OF THE DRAWING

These and other objects and advantages of the invention will be more readily apparent from the following detailed description when considered in conjunction with the accompanying drawing wherein:

FIGS. 2a through 2h show wave forms at various places in the FIG. 1 circuit.

SUMMARY OF THE INVENTION

A power circuit arrangement embodying the invention for a power conditioning system which supplies variable frequency, variable magnitude voltage to an electromagnetic device provided with a center-tapped winding includes first and second inverting thyristors which are adapted to be connected to the respective ends of the winding and are connected in series with a semiconductor chopper across a unidirectional source so the inverting thyristors may be gated on alternately at a lower frequency to energize the winding halves in push-pull while the chopper may be time ratio controlled at a higher carrier frequency to selectively vary the voltage applied to the winding. A capacitor in shunt to the transistor chopper is overcharged due to winding leakage reactance when the chopper is turned off to reverse bias and "soft" commutate the inverting thyristors when they are not conducting load current. A free-wheeling thyristor connected between the winding center tap and the chopper is poled to form low impedance free-wheeling paths for winding currents in series with the first and second inverting thyristors respectively when the chopper is turned off. First and second energy recovery diodes connected respectively across the serial arrangement of the chopper with the first and second inverting thyristors provide paths for out-of-phase current and for current when the free-wheeling thyristor is turned off during commutation of the inverting thyristors.

DETAILED DESCRIPTION

Figure 1:
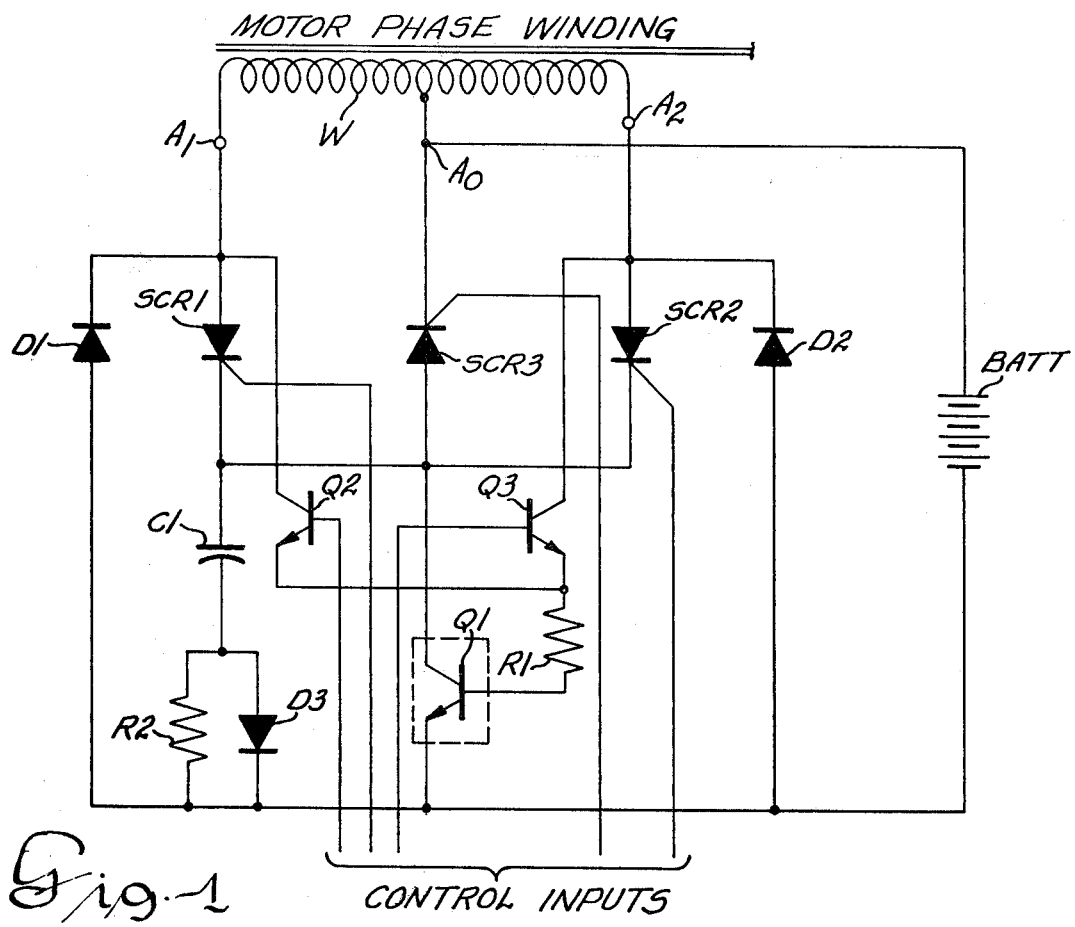
FIG. 1 is a schematic circuit diagram of a power circuit embodying the invention for one motor phase of an alternating current traction drive.

A compact, relatively inexpensive, efficient and simple power circuit for one motor phase of a power conditioning polyphase traction motor drive embodying my invention is illustrated in FIG. 1. Each motor stator phase winding W has a center tap $A_0$ connected to the positive side of a unidirectional source BATT and the respective winding ends $A_1$ and $A_2$ connected to inverting thyristors SCR 1 and SCR 2 of the power circuit which are coupled through the emitter-collector path of a power switch, or transistor chopper Q1 to the negative side of source BATT. First and second inverting thyristors SCR 1 and SCR 2 may be gated on alternately at motor frequency to energize the respective motor stator winding halves $A_1$-$A_0$ and $A_0$-$A_2$ in push-pull, as shown in FIGS. 2a and 2b, and thus may be of the low-speed, inexpensive type. Transistor chopper Q1 may be time ratio controlled (or pulse width modulated) at a higher carrier frequency as shown in FIG. 2c to selectively control the average voltage applied to winding W. It will be appreciated that the disclosed arrangement has voltage controlling chopper Q1 coupled in series with first and second load current carrying thyristors SCR 1 and SCR 2 across the positive and negative polarities of the unidirectional source.

A free-wheeling thyristor SCR 3 has its cathode connected to center tap $A_0$ and its anode coupled to the collector of transistor chopper Q1, and thyristor SCR 3 may be gated on during the intervals that chopper Q1 is turned off, as shown in FIG. 2f, to provide a low impedance free-wheeling path for the winding current in series with the inverting thyristor SCR 1 or SCR 2 which is then conducting.

A capacitor C1 is connected in series with the parallel arrangement of a resistance R2 and a diode D3 in shunt to the emitter-collector path of transistor chopper Q1. An energy recovery diode D1 is connected across the serial arrangement of inverting thyristor SCR 1 with chopper Q1, and an energy recovery diode D2 is similarly connected across the serial arrangement of inverting thyristor SCR 2 with chopper Q1. Energy recovery diodes D1 and D2 provide current paths for out-of-phase current and for winding current during commutation of SCR 1 and SCR 2 when free-wheeling thyristor SCR 3 is turned off.

First and second base drive transistors Q2 and Q3 for transistor chopper Q1 have their emitters connected through a resistance R1 to the base of transistor chopper Q1 and their collectors connected to the respective ends $A_1$ and $A_2$ of phase winding W. Turning on driver transistor Q2 applies the forward voltage drop across first inverting thyristor SCR 1 through resistance R1 to the base of NPN transistor chopper Q1 to forward bias Q1 into conduction. Driver transistor Q2 is time ratio controlled, as shown in FIG. 2e, during the 180° motor frequency half cycle when first inverting thyristor SCR 1 is conducting to thereby time ratio control chopper Q1. Similarly, turning on driver transistor Q3 applies the forward voltage drop across second inverting thyristor SCR 2 through resistance R1 to the base of transistor chopper Q1 to forward bias Q1 into conduction, and driver transistor Q3 is time ratio controlled, as shown in FIG. 2d, during the 180° motor frequency half cycle when second inverting thyristor SCR 2 is conducting to thereby time ratio control, or pulse width modulate, chopper Q1. It will be appreciated that the forward drop of inverting thyristors SCR 1 and SCR 2 provide an efficient and low-cost biasing source for the power transistor switch Q1.

Although it is represented in FIGS. 2c, 2d and 2e that Q1, Q2 and Q3 are turned on by pulses of uniform width, it will be appreciated that the width of such pulses may be selectively controlled. The variable width pulses flowing in winding half $A_0$-$A_2$ when inverting thyristor SCR 2 is gated on are magnetically coupled to winding half $A_0$-$A_1$ with 180° phase inversion as illustrated in FIG. 2h.

Transistor chopper Q1 is time ratio controlled so that it is not conducting during the intervals that inverting thyristors SCR 1 and SCR 2 are being commutated, and further free-wheeling thyristor SCR 3 is controlled so that it is not conducting while SCR 1 and SCR 2 are being commutated. This opens all possible current paths for inverting thyristors SCR 1 and SCR 2 while they are being commutated, and the leakage reactance between the two winding halves $A_1$-$A_0$ and $A_0$-$A_2$ plus the stray reactance causes capacitor C1 to overcharge during the commutation cycle. The overcharge on capacitor C1 reverse biases the then conducting inverting thyristor SCR 1 or SCR 2 and "soft" commutates it off when it is not conducting load current.

Assume for the purpose of describing the preferred commutation sequence that second inverting thyristor SCR 2 is being gated on and that gating signals thereto are removed at time t1. Transistor chopper Q1 is turned on for 150 microseconds at time t1 to reverse bias free-wheeling thyristor SCR 3 and commutate it off. Usually free-wheeling thyristor SCR 3 is fired again at the end of each chopper pulse, but SCR 3 is not gated on again during the commutation sequence at time t2 when chopper Q1 is turned off. Inasmuch as chopper Q1 and free-wheeling thyristor SCR 3 are both off, all possible current paths for second inverting thyristor SCR 2 are open. The voltage between the winding ends $A_2$ and $A_1$ builds up to more than twice the potential of source BATT due to leakage reactance between the winding halves and stray reactances and charges capacitor C1 as illustrated in FIG. 2g, in a path through SCR 2, C1, D3 and energy recovery diode D1 to a voltage greater than twice the voltage of source BATT. Second inverting thyristor SCR 2 is thus reverse biased and "soft" commutated off, as shown at time t3 in FIG. 2b, by the capacitor overcharge for the 150 microseconds during which transistor chopper Q1 remains off. After SCR 2 is commutated off, the current switches to a path through energy recovery diode D2 and source BATT.

Transistor chopper Q1 is then turned on simultaneously with the gating on of first inverting thyristor SCR 1 at time t4 to energize the other winding half $A_1$-$A_0$.

Capacitor C1 together with resistance R2 and diode D3 provide a path-shaping circuit for transistor chopper Q1 which avoids simultaneous high voltage and high current during turning off of chopper Q1. If the voltage rises across chopper Q1, current flows in capacitor C1 and thus transfers current from chopper Q1 to capacitor C1.

It will be noted that transistor chopper Q1 switches power during the energization of both winding halves $A_1$-$A_0$ and $A_0$-$A_2$ is thus utilized twice as much as power transistors of known push-pull arrangements. Further, the semiconductor voltage drop in the load circuit is limited to the forward drop of one thyristor (SCR 1 or SCR 2) plus that of one saturated transistor Q1 and is thus considerably less than in known variable frequency, variable voltage drives such as pulse width modulated inverters of the SCR type wherein the resistance of a smoothing reactor may be in series with a chopper and two thyristors in the load circuit or wherein the voltage drop may be across two thyristors arranged in a bridge circuit.

Figure 3:
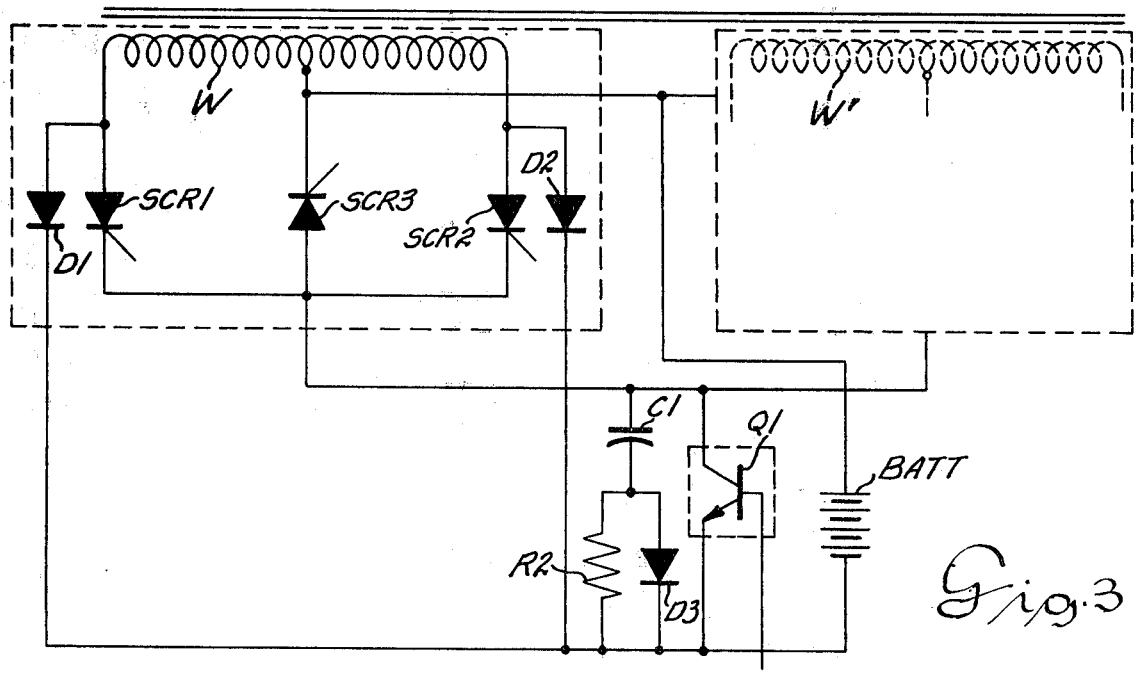
FIG. 3 schematically illustrates an alternative embodiment wherein one chopper is common to a plurality of phases.

In alternative embodiments where harmonic reduction is not required, power switch transistor chopper Q1 and capacitor C1 can be common to a plurality of phase windings as schematically illustrated in FIG. 3 wherein winding W of the FIG. 1 embodiment is shown within a dotted line block designated phase A and a similar phase winding W' is indicated in dotted lines within a block designated phase B. In such embodiments a larger number of inverting thyristors are commutated by a single power switch.

In other alternative embodiments the power conditioning system is single phase, while in still other embodiments a semiconductor chopper of the thyristor type is utilized instead of a transistor chopper.

My copending application Ser. No. 744,131 filed Nov. 2, 1976 and having the same assignee as this invention discloses a variable frequency, variable voltage motor power supply of the thyristor bridge inverter type having a time ratio controlled transistor chopper connected in series with first and second load current carrying and motor frequency establishing thyristors across the positive and negative polarities of a unidirectional source and reverse bias voltage is applied to the thyristors when the transistor chopper is turned off to "soft" commutate them while they are not conducting load current, in a manner similar to the present invention.

While only a single embodiment of my invention has been illustrated and described, many modifications and variations thereof will be readily apparent to those skilled in the art, and consequently it should be understood that I do not intend to be limited to the particular embodiment shown and described.

The embodiments of the invention in which an exclusive property or privilege is claimed are defined as follows:

1. In a power conditioning system for supplying variable frequency and variable magnitude power to an electromagnetic device having at least one winding provided with a center tap, a power circuit including first and second inverting thyristors which are adapted to be connected to the respective ends of said winding, said winding center tap being adapted to be connected to one polarity of a unidirectional source, a semiconductor chopper coupling said first and second inverting thyristors to the other polarity of said source, whereby said first and second inverting thyristors may be gated on alternately at a relatively low frequency to energize the respective halves of said winding in push-pull while said chopper is time ratio controlled at a higher carrier frequency to selectively vary the voltage applied to said winding, and a capacitor in shunt to said chopper, whereby said inverting thyristors may be commutated off by the charge on said capacitor when said chopper is off so they are not conducting load current.

2. In a power conditioning system in accordance with claim 1 and including a free-wheeling thyristor connected between said winding center tap and said chopper poled to form low impedance free-wheeling paths with said first and second inverting thyristors respectively while said chopper is turned off and the inverting thyristor is conducting.

3. In a power conditioning system in accordance with claim 2 and including first and second energy recovery diodes connected respectively across the serial arrangements of said chopper with said first and second inverting thyristors and providing paths for current during commutation of said inverting thyristors when said chopper and said free-wheeling thyristor are turned off.

4. In a power conditioning system in accordance with claim 3 wherein said capacitor is connected in series with the parallel arrangement of a diode and a resistor across said chopper.

5. In a power conditioning system in accordance with claim 3 wherein said semiconductor chopper is a transistor.

6. In a power conditioning system in accordance with claim 5 and including first and second base drive transistors for said transistor chopper arranged when conducting to provide forward bias to said transistor chopper to turn it on, the forward voltage drop across said first and second inverting thyristors providing bias sources for said first and second base drive transistors respectively so that they can be selectively turned on at said carrier frequency during the respective said low frequency half cycles when the corresponding inverting thyristors conduct.

7. In a power conditioning system in accordance with cliam 3 wherein said electromagnetic drive is polyphase and has a plurality of phase windings each of which has a center tap connected to said one polarity of said source and its respective ends connected to first and second inverting thyristors which are connected through said semiconductor chopper to said other polarity of said source.

8. In a power conditioning system in accordance with claim 7 wherein said electromagnetic device is an electric motor and said first and second inverting thyristors associated with each said phase winding may be gated on at motor frequency to energize the respective winding halves in push-pull while said chopper is time ratio controlled at said carrier frequency to selectively vary the voltage applied to said phase winding.

9. In a drive for a polyphase electric motor having a plurality of center-tapped stator phase windings, a power circuit including first and second inverting thyristors associated with each said phase winding and adapted to be connected to the respective ends thereof and being connected in series with a semiconductor chopper across a unidirectional power source, whereby said first and second inverting thyristors may be gated on alternately at motor frequency to energize the respective halves of said phase winding in push-pull while said chopper is time ratio controlled at a higher carrier frequency to selectively vary the voltage applied to said winding, and a capacitor in shunt to said chopper, whereby said inverting thyristors may be commutated off by the charge on said capacitor when said chopper is off so they are not conducting load current.

10. A power circuit in accordance with claim 9 and including a free-wheeling thyristor connected between said phase winding center tap and said chopper poled to form low impedance free-wheeling paths with said first and second inverting thyristors respectively while said chopper is turned off and the inverting thyristor is conducting.

11. A power circuit in accordance with claim 10 and including first and second energy recovery diodes connected respectively across the serial arrangements of said chopper with said first and second inverting thyristors and providing paths for current during commutation of said inverting thyristors when said chopper and said free-wheeling thyristor are turned off.

12. A power circuit in accordance with claim 11 wherein said semiconductor chopper is a transistor and said capacitor is connected in series with the parallel arrangement of a diode and a resistor across said transistor chopper.

13. A power circuit in accordance with claim 12 and including first and second base drive transistors for said transistor chopper arranged when conducting to respectively provide forward bias to said transistor chopper to turn it on, the forward voltage drop across said first and across said second inverting thyristors providing bias sources for said first and second base drive transistors respectively so that they can be selectively turned on during the respective motor frequency half cycles when the corresponding inverting thyristors conduct.

14. In a power conditioning system for selectively regulating the speed of a polyphase alternating current motor having a plurality of center tapped phase windings energized from a unidirectional power source, a power circuit including first and second inverting thyristors associated with each phase winding and adapted to be connected to the respective ends thereof and through a transistor chopper to one polarity of said source, said center tap being adapted to be connected to the other polarity of said source, whereby said first and second inverting thyristors may be gated on at motor frequency to energize the respective halves of said phase winding in push-pull while said transistor chopper is time ratio controlled at carrier frequency to selectively vary the voltage applied to said winding.

a free-wheeling thyristor having one side coupled to said transistor chopper and its other side adapted to be connected to said phase winding center tap and poled to provide low impedance free-wheeling paths with said first and second inverting thyristors respectively for winding currents when said transistor chopper is turned off, a commutation capacitor coupled across said transistor chopper, and first and second energy recovery diodes coupled respectively across the serial arrangements of said transistor chopper with said first and second inverting thyristors and providing current paths during commutation of said inverting transistors when said transistor chopper and said free-wheeling thyristor are turned off.

15. A power source in accordance with claim 14 wherein said commutation capacitor is connected in series with the parallel arrangement of a diode and a resistance across said transistor chopper.

16. A power source in accordance with claim 15 and including first and second base drive transistors for said transistor chopper arranged when conducting to respectively provide forward bias to said transistor chopper to turn it on, the forward voltage drop across said first and across said second inverting thyristors providing bias sources for said first and second base drive transistors respectively so that they can be selectively turned on during the respective motor frequency half cycles when the corresponding inverting thyristors conduct.

* * * * *